United States Patent [19]

Wall

[11] Patent Number: 5,782,324
[45] Date of Patent: Jul. 21, 1998

[54] COMPOSITE BRAKE DRUM AND METHOD FOR PRODUCING SAME

[75] Inventor: Donald R. Wall, Dayton, Ohio

[73] Assignee: Dayton Walther Corporation, Dayton, Ohio

[21] Appl. No.: 769,196

[22] Filed: Dec. 18, 1996

Related U.S. Application Data

[60] Provisional application No. 60/009,425, Dec. 27, 1995.

[51] Int. Cl.$^6$ ........................................... F16D 65/10
[52] U.S. Cl. ........................... 188/218 R; 29/527.5; 29/527.7
[58] Field of Search ....................... 188/218 R, 78; 29/527.5, 527.7, 888.06; 72/68, 348

[56] References Cited

U.S. PATENT DOCUMENTS

| | | | |
|---|---|---|---|
| 1,686,346 | 10/1928 | Sanford | 188/218 R |
| 1,746,494 | 2/1930 | Norton | 188/218 R |
| 1,876,354 | 9/1932 | Sinclair | 188/218 R |
| 2,493,173 | 1/1950 | Halteren | 188/218 R |
| 3,354,535 | 11/1967 | Winnai et al. | 188/218 R |
| 4,067,098 | 1/1978 | Blair, Jr. | 29/558 |
| 4,262,407 | 4/1981 | Petersen et al. | 29/460 |
| 5,285,874 | 2/1994 | Revyn | 188/218 R |
| 5,345,672 | 9/1994 | Ball et al. | 29/715 |
| 5,385,216 | 1/1995 | Kulczycki | 188/218 R |
| 5,586,625 | 12/1996 | Julow et al. | 188/218 R |

*Primary Examiner*—Peter M. Poon
*Attorney, Agent, or Firm*—MacMillan, Sobanski & Todd

[57] ABSTRACT

A composite brake drum for use in a drum brake assembly includes a one-piece mounting flange and shell and a liner cast integrally in a shell portion thereof. The method for forming the composite brake drum of this invention includes the steps of: (a) providing a generally flat sheet of a first material; (b) forming the flat sheet into a generally flat circular blank; (c) subjecting to the blank to a series of metal forming operations to produce a one piece mounting flange and shell; and (d) casting a liner formed from a second material within the one-piece mounting flange and shell to thereby produce the composite brake drum.

19 Claims, 6 Drawing Sheets

COMPOSITE BRAKE DRUM AND METHOD FOR PRODUCING SAME

CROSS-REFERENCE TO RELATED APPLICATIONS

This application claims the benefit of U.S. Provisional Application No. 60/009,425, filed Dec. 27, 1995.

BACKGROUND OF THE INVENTION

This invention relates in general to vehicle drum brake assemblies and in particular to an improved structure for a composite brake drum for use in such a vehicle drum brake assembly and method for producing the same.

Most vehicles are equipped with a brake system for slowing or stopping movement of the vehicle in a controlled manner. A typical brake system includes either a disc brake assembly or a drum brake assembly for each of the wheels. The brake assemblies are typically actuated by hydraulic or pneumatic pressure generated by an operator of the vehicle depressing a foot pedal, pulling a hand lever, and the like. The structure and operation of the brake assemblies, as well as the actuators therefor, are well known in the art.

FIG. 1 illustrates a prior art pneumatically actuated drum brake assembly, indicated generally at 10, typically for use with a heavy duty truck and trailer. As shown therein, the drum brake assembly 10 includes a backing plate 12 which is secured to a fixed, non-rotatable component of the vehicle, such as the vehicle axle housing (not shown). A pair of opposed arcuate brake shoes 14 (only one brake shoe 14 is illustrated) are supported on the backing plate 12 for selective movement relative thereto. Each of the brake shoes 14 has a friction pad 16 secured thereto.

The brake drum assembly 10 further includes a hollow cylindrical "heavy duty" composite brake drum 18 shown in prior art FIG. 2. The brake drum 18 is disposed adjacent the backing plate 12 such that the brake shoes 14 extend within an inner cylindrical braking surface 24A thereof. To effect braking action, the brake shoes 14 are moved outwardly apart from one another such that the friction pads 16 frictionally engage the cylindrical braking surface 24A of the brake drum 18. Such frictional engagement causes slowing or stopping of the rotational movement of the brake drum 18 and, therefore, the wheel of the vehicle in a controlled manner.

One or more actuating mechanisms are provided in the drum brake assembly 10 for selectively moving the brake shoes 14 outwardly apart from one another into frictional engagement with the cylindrical braking surface 24A of the brake drum 18. Usually, a pneumatically actuated service brake mechanism is provided for selectively actuating the drum brake assembly 10 under normal operating conditions. Typically, the service brake mechanism includes an air chamber device 26, a lever assembly 28, and a S-cam actuating mechanism 30. To actuate the service brake, pressurized air is supplied to the air chamber device 26 to actuate the lever assembly 28 which in turn rotates the S-cam actuating mechanism 30 to move brake shoes 14 apart from one another into frictional engagement with the cylindrical braking surface 24A of the brake drum 18. A mechanically actuated parking and emergency brake mechanism is also usually provided for selectively actuating the drum brake assembly 10 in a similar manner.

FIG. 3 illustrates a typical sequence of steps for producing the brake drum 18 shown in prior art FIGS. 1 and 2. First, referring to the left hand side of FIG. 3, the steps involved in the process of forming a shell portion 22 and a liner portion 24 of the brake drum 18 are illustrated. Initially, in step 40, a flat sheet of suitable material, such as for example steel, is formed into a generally flat band having a desired profile, such as by a roll forming process. Next, in step 42, the opposed ends of the band are disposed adjacent one another and welded together to form a hoop. In step 44, the hoop is expanded to produce the shell portion 22 having a desired profile shown in FIG. 2. Following this, the liner portion 24 is cast in the shell portion 22, preferably by a centrifugally casting process in step 46. After this, in step 48, the shell portion 22 and the liner portion 24 are rough machined.

Now, referring to the right hand side of FIG. 3, the steps involved in the process of forming a mounting flange portion 20 of the brake drum 18, and the steps involved in the process of forming the brake drum 18 itself, are illustrated. In step 50, a flat sheet of suitable material, such as for example steel, is formed into a mounting flange blank, such as by a stamping process. Following this, in step 52, the mounting flange blank is formed into the mounting flange portion 20 having a desired profile by a stamping process. A plurality of lug bolt mounting holes 20C (only one lug bolt mounting hole 20C being illustrated in FIG. 2), can be simultaneously formed in the flange portion 20. As is known, lug bolts (not shown) extend through the lug bolt holes 20C to secure the brake drum 18 to a vehicle wheel (not shown) for rotation therewith. In step 54, an inner end 20A of the mounting flange portion 20 is disposed adjacent an outer end 22B of the shell portion 22 and welded together to join the shell portion 22 and the liner 24 portion to the mounting flange portion 20. Next, a pilot hole 20B is formed in the mounting flange portion 20 during step 56.

In step 58, the brake drum 18 is finish machined to predetermined tolerances. Following this, the brake drum 18 is typically subjected to a balancing operation in step 60. In particular, one or more wheel balance weights (not shown) are usually attached to an outer surface of the shell portion 22 by welding to produce the finished brake drum 18. Typically, the mounting flange 20 of the brake drum 18 defines a generally constant mounting flange thickness T1, and the shell portion 22 defines a generally constant shell thickness T2 which is less than the mounting flange thickness T1. Alternatively, the brake drum can be a heavy duty "full cast" brake drum, indicated generally at 32 in prior art FIG. 4. As shown therein, the brake drum 32 includes an integral raised squealer band 34 provided on an outer surface thereof. The composite brake drum 18 illustrated in FIGS. 1 and 2 is considerably lighter than the full cast brake drum 32 illustrated in FIG. 4. However, the full cast brake drum 32 can be produced using a simpler manufacturing process than the process used to produce the composite brake drum 18. Also, each of the brake drums 18 and 32 typically incorporates a sufficient imbalance which renders them unsatisfactory for use on a vehicle without balancing. There are several known methods for correcting the imbalance of the brake drums 18 and 32. Typically, the composite brake drum 18 is balanced by welding balance weights to the outer surface of the drum. While the full cast brake drum 32 can be balanced in a similar manner, it can also be balanced according to the methods disclosed in U.S. Pat. No. 4,986,149 to Carmel et al. and U.S. Pat. No. 5,483,855 to Julow et al. According to the method of the Carmel et al. patent, a crescent or wedge of material is preferably cut away from an outer surface of the squealer band by a lathe during an eccentric turning process to produce a final balanced brake drum. According to the method of the Julow et al. patent, a circumferentially extending substantially constant depth cut is made along a portion of the squealer band by a milling machine to produce a final balanced brake drum. Thus, it would be desirable to provide an improved structure for a composite brake drum and method for producing such a brake drum which is relatively simple and economical.

SUMMARY OF THE INVENTION

This invention relates to an improved structure for a composite brake drum for use in a drum brake assembly and a method for producing such a brake drum. The composite brake drum includes a one-piece mounting flange and shell having a liner cast integrally in the shell portion thereof. The method for forming the composite brake drum of this invention includes the steps of: (a) providing a generally flat sheet of material; (b) forming the flat sheet into a generally flat circular blank; (c) subjecting the blank to a series of metal forming operations to produce a one piece mounting flange and shell; and (d) casting a liner within the one-piece mounting flange and shell to thereby produce the composite brake drum.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
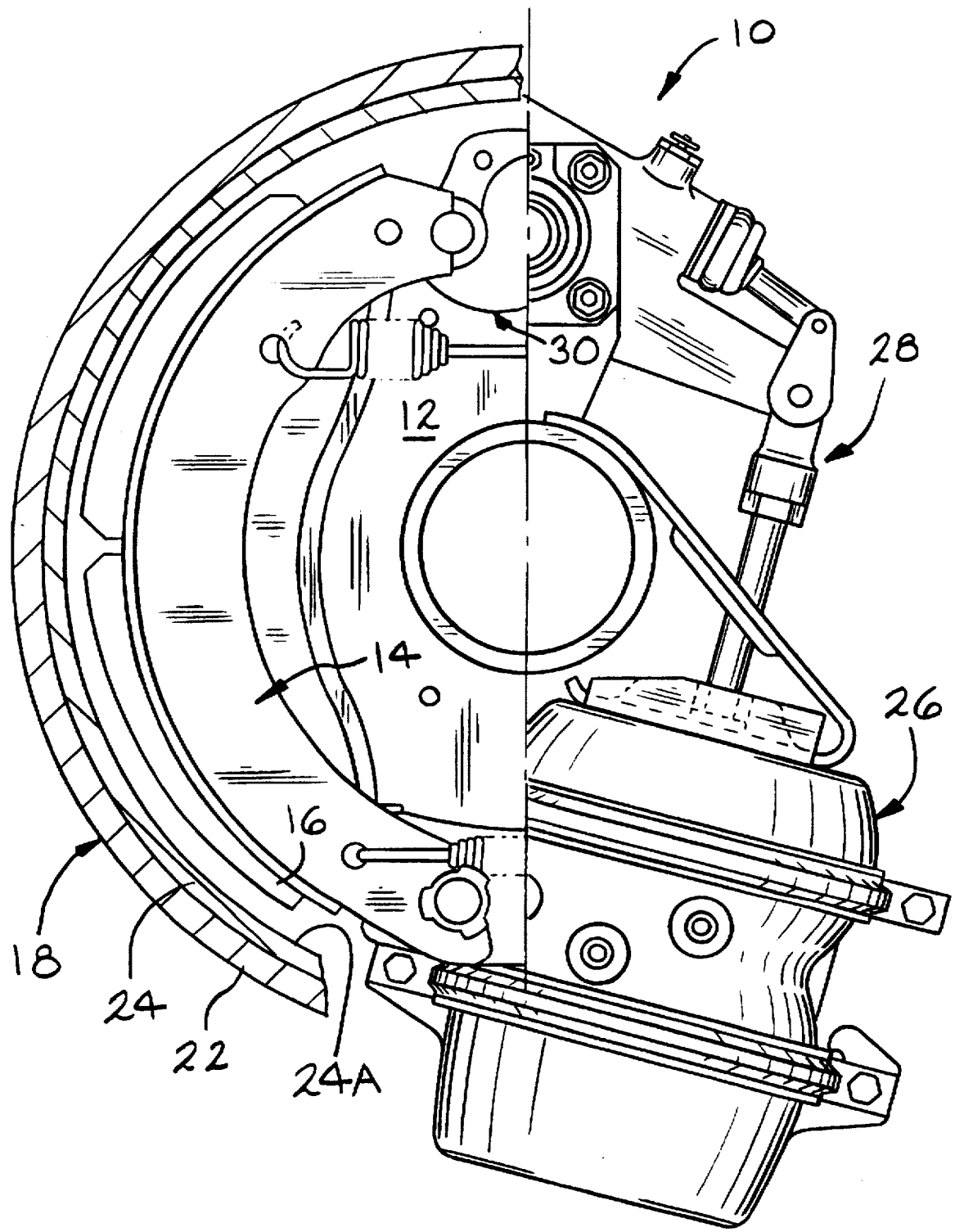
FIG. 1 is a sectional view, partially broken away, of a portion of a prior art heavy duty truck and trailer drum brake assembly.
Figure 2:
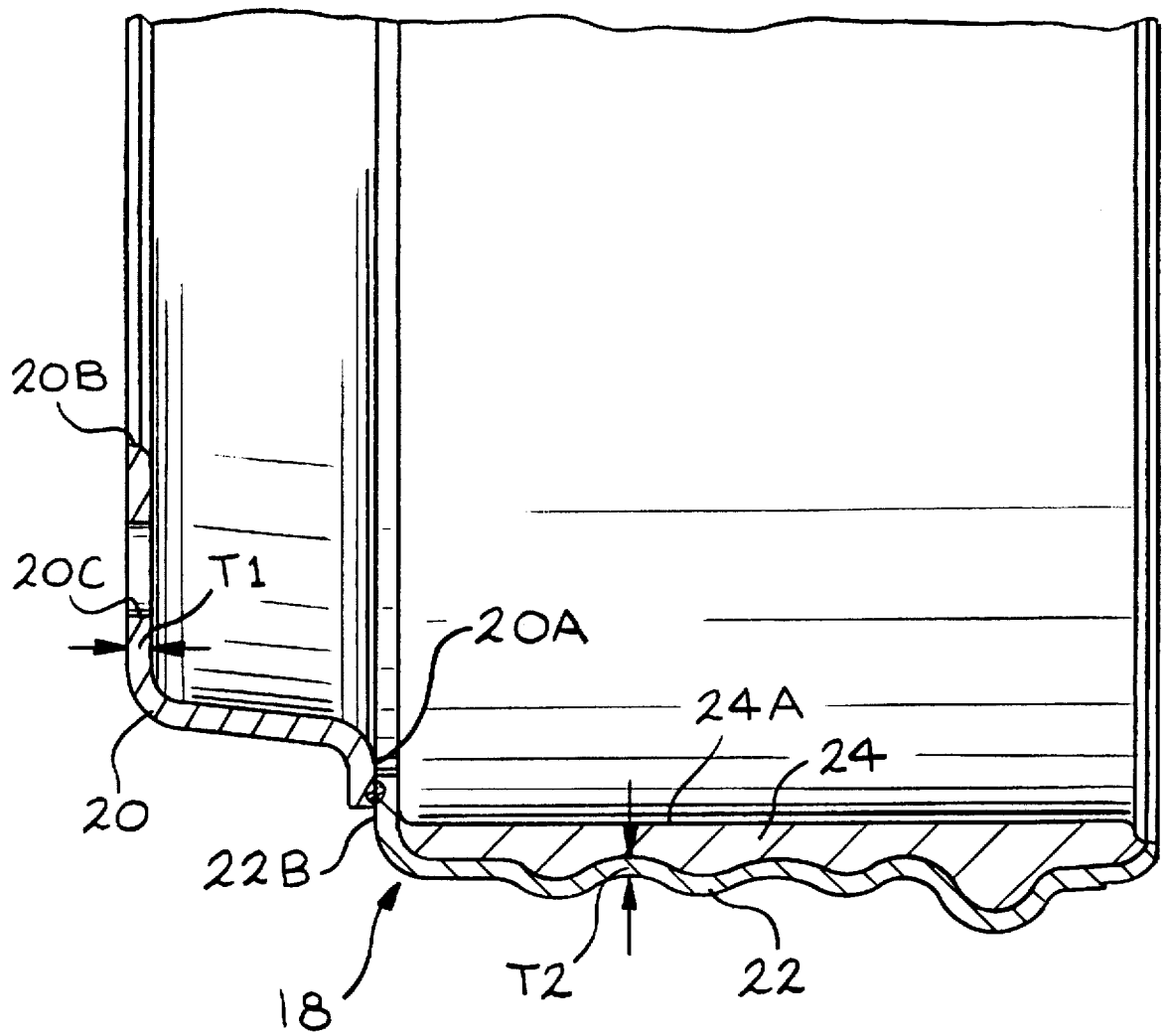
FIG. 2 is a sectional view of a prior art brake drum illustrated in FIG. 1.
Figure 3:
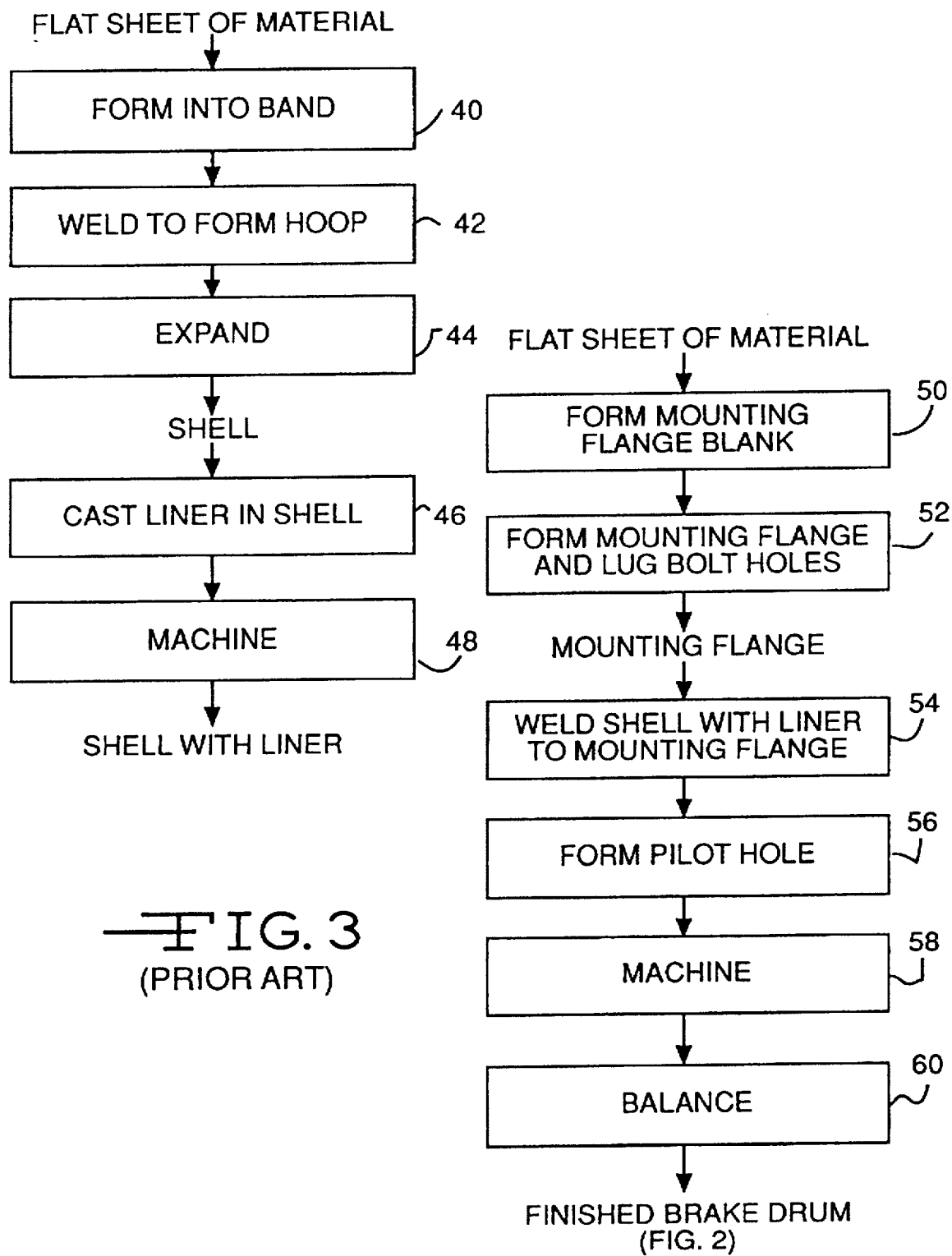
FIG. 3 is a block diagram illustrating the sequence of steps for producing the prior art brake drum illustrated in FIG. 2.
Figure 4:
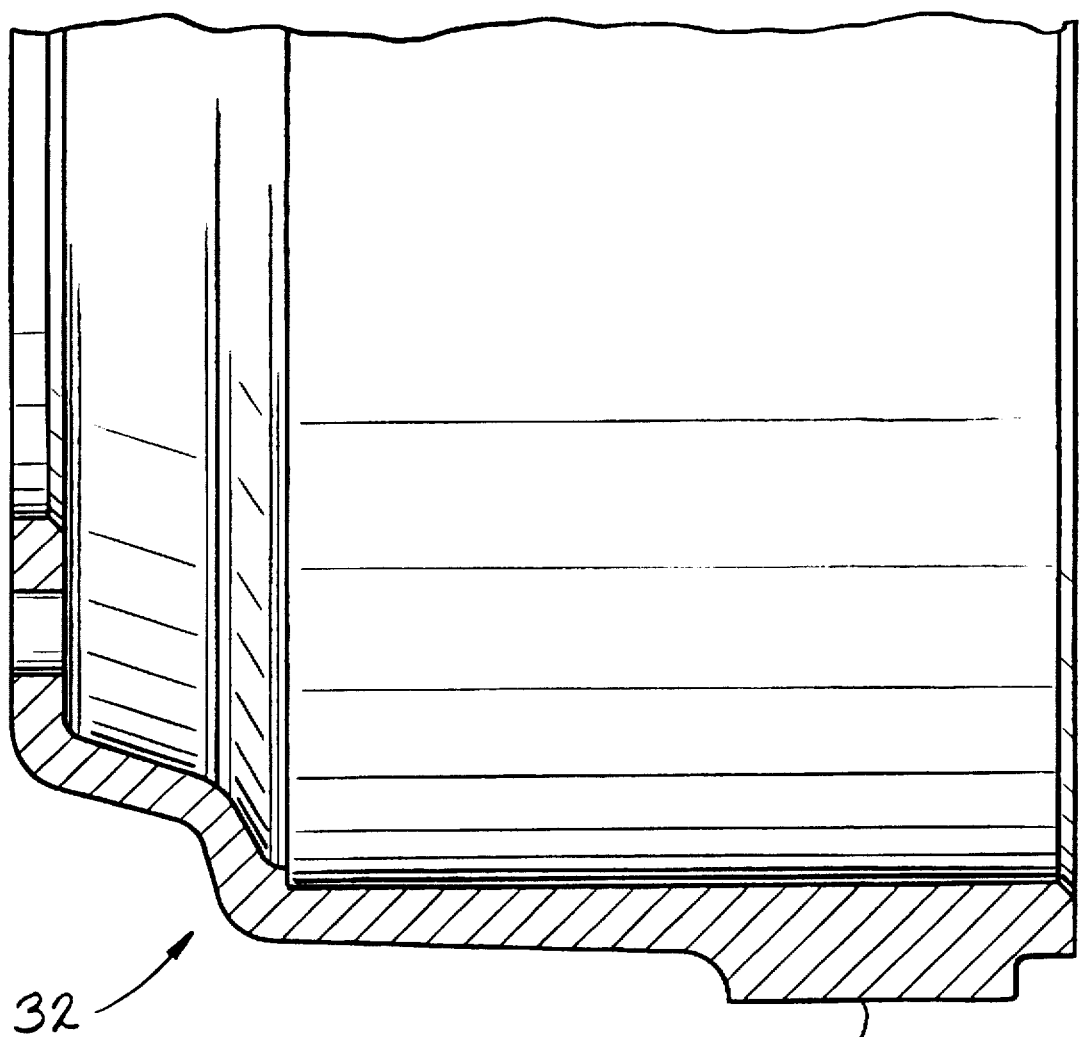
FIG. 4 is a sectional view similar to FIG. 2 of an alternate embodiment of a prior art brake drum.
Figure 5:
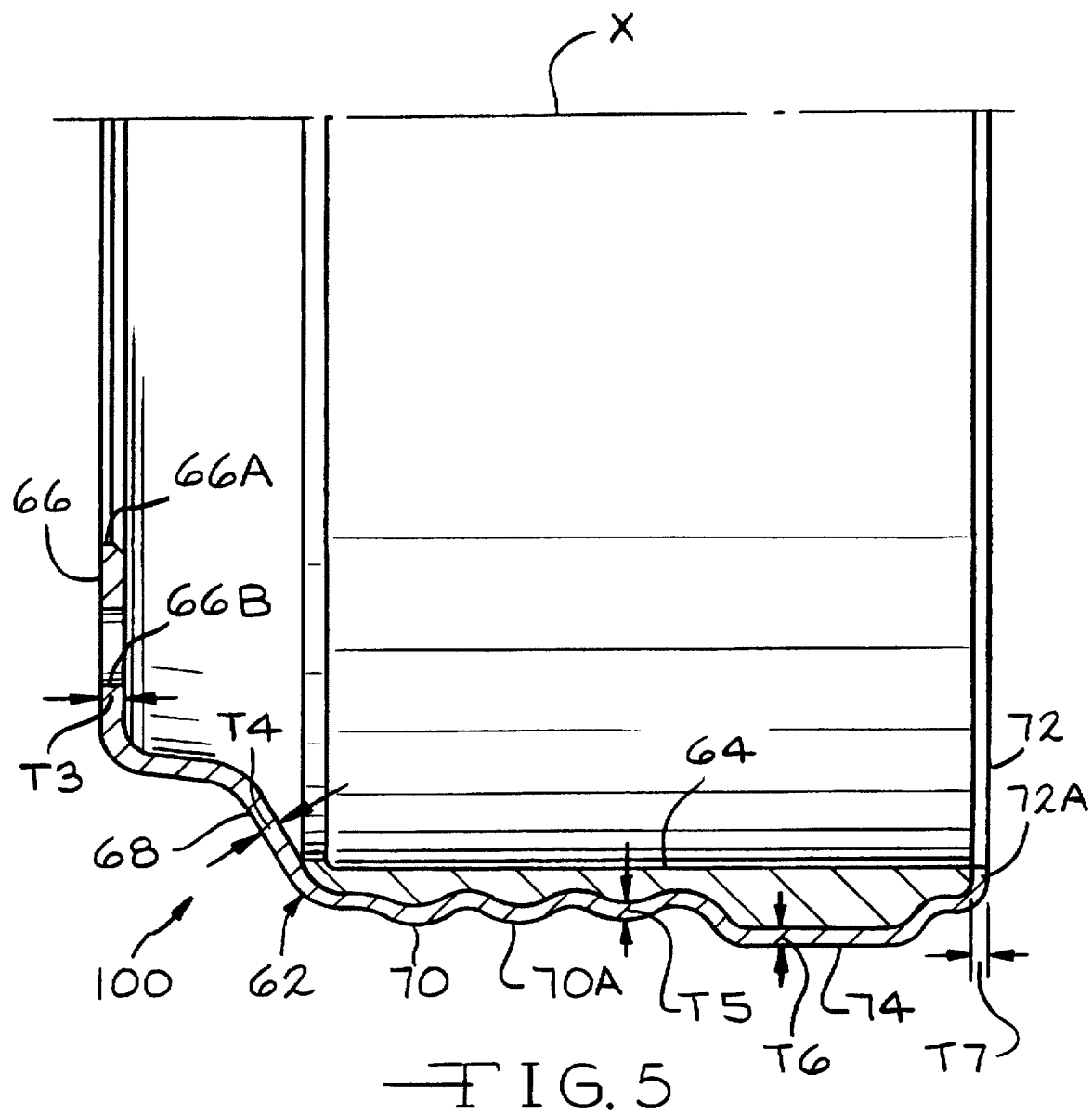
FIG. 5 is a sectional view of an improved structure for a brake drum in accordance with this invention.

Referring now to the drawings, there is illustrated in FIG. 5 a composite brake drum, indicated generally at 100, in accordance with this invention. As shown therein, the brake drum 100 includes a one-piece mounting flange and shell, indicated generally at 62, and a liner 64. As will be discussed below, the one-piece mounting flange and shell 62 is preferably formed from steel and the liner 64 is preferably formed from gray cast iron.

The one-piece mounting flange and shell 62 defines a center longitudinal axis X and includes a generally closed end or mounting flange portion 66, a transition section 68, a generally axially extending cylindrical main body 70, and an opened end 72 having an annular lip 72A. The cylindrical body portion 70 defines an outer surface 70A and, in the illustrated embodiment, includes a raised continuously extending annular squealer band 74. For discussion purposes, the mounting flange portion 66 of the one-piece mounting flange and shell 62 includes the mounting flange 66, and the shell portion of the one-piece mounting flange and shell 62 includes a portion of the transition section 68 and the cylindrical main body 70.

The mounting flange portion 66 of the brake drum 100 includes a generally centrally located pilot hole 66A formed therein and a plurality of lug bolt holes 66B (only one lug bolt hole 66B being illustrated) spaced circumferentially around the pilot hole 66A. The lug bolt mounting holes 66B are adapted to receive wheel mounting studs (not shown) for securing a wheel (not shown) to the brake drum 100 for rotation therewith.

The mounting flange portion 66 defines a generally constant thickness T3, and the transition section 68 defines a generally constant thickness T4. The cylindrical body 70 defines a generally constant thickness T5, the squealer band 74 defines a generally constant thickness T6, and the opened end 72 defines a generally constant thickness T7. As will be discussed below, in the illustrated embodiment the thicknesses T3 and T6 are approximately equal to one another, and the thicknesses T4, T5, and T7 are approximately equal to one another and less than the thicknesses T3 and T6.

Figure 6:
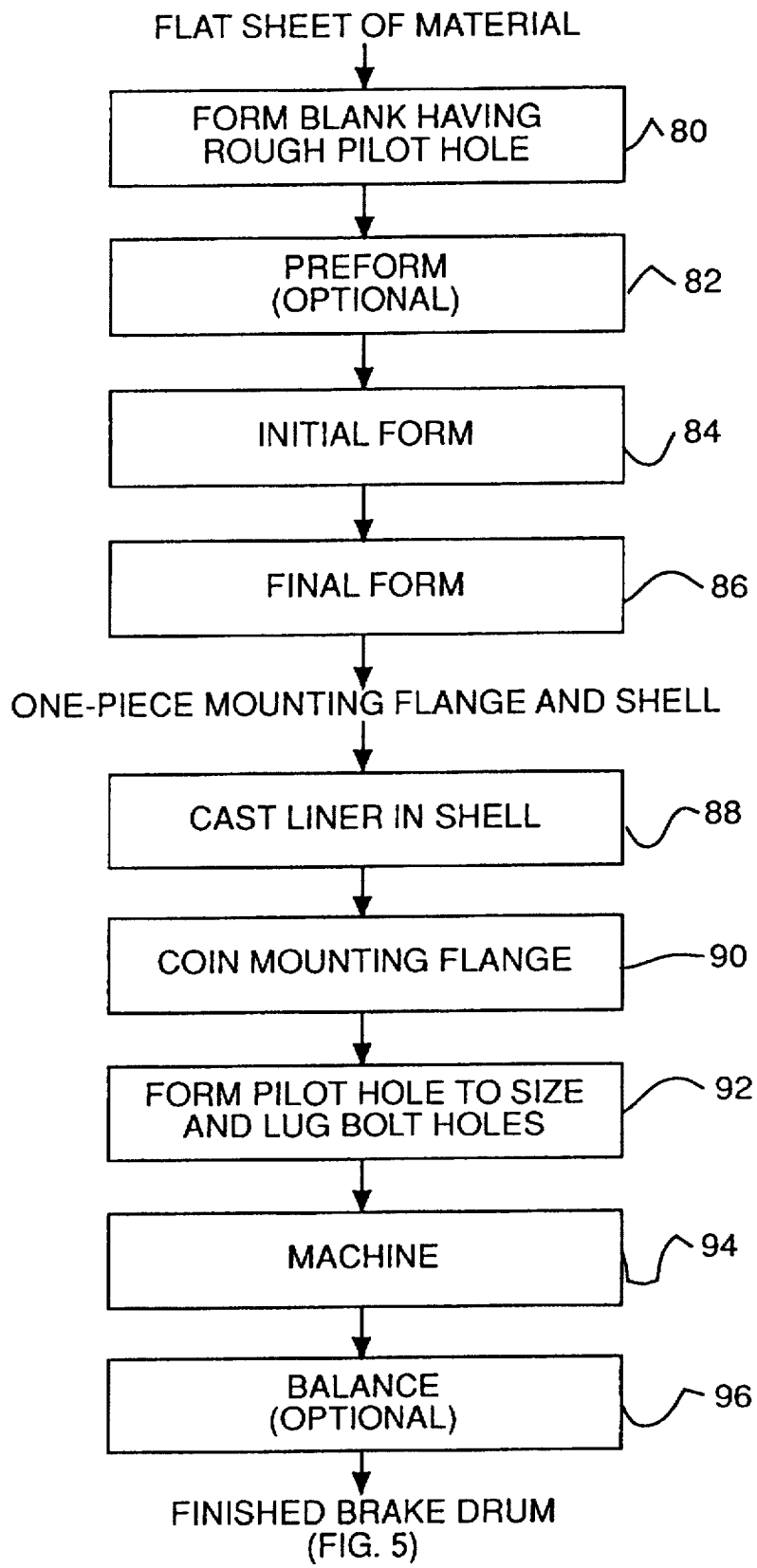
FIG. 6 is a block diagram illustrating the sequence of steps for producing the brake drum illustrated in FIG. 5.

Turning now to FIG. 6, there is illustrated a block diagram of a sequence of steps for producing the composite brake drum 100 of this invention. Initially, in step 80, a flat sheet of suitable material, such as for example steel, is subjected to a stamping operation to produce a generally flat circular blank having a rough pilot hole formed therein. Following this, in optional step 82, the blank is subjected to a stamping operation to produce a brake drum preform having a desired profile. In particular, during optional step 82, the mounting flange portion 66 of the brake drum 100 can be formed to a desired profile.

Next, in step 84, the blank or preform (if step 82 is performed) is supported in a suitable fixture, such as for example a well known mandrel-tailstock assembly, and is subjected to an initial forming process. During step 84, preferably a spinning tool is actuated and engages the material in order to spin form a shell portion having a desired profile. In particular, during step 84, the spinning tool makes multiple passes in order to form the desired profile of the shell portion of the brake drum 100. Also, as illustrated and discussed below, during step 84 selected sections of the shell portion of the brake drum 100 are preferably thinned to predetermined tolerances. Following this, the shell portion of the brake drum 100 is subjected to a final forming process in step 86. During step 86, preferably a flow forming tool is actuated and engages the material in order to flow form the shell portion of the brake drum 100 against the mandrel and produce a finished shell portion profile, such as shown in FIG. 5.

Next, in step 88, a gray iron liner 64 is cast in the shell portion of the one-piece mounting flange and shell 62. Preferably, the casting of the liner 64 is accomplished using a centrifugal casting process. However, other casting processes may be used as desired. After the casting of the liner 64, the mounting flange portion 66 of the brake drum is coined in step 90, and a pilot hole 66A is formed to a predetermined size along with the forming of the lug bolt mounting holes 66B during step 92. Following this, the brake drum 100 is machined to predetermined tolerances during step 94. Next, in optional step 96, the brake drum is subjected to a balancing operation to produce the finished brake drum 100.

One advantage of this invention is that the brake drum 100 includes a one-piece mounting flange and shell 62, compared to the prior art composite brake drum 18 having a separate mounting flange 20 and shell 22 which were welded together. Also, by forming the one-piece mounting flange and shell 62 of this invention by using a spin forming process, the thickness of one-piece mounting flange and shell 62 can be varied along the length thereof and held to tight tolerances.

For example, when using a steel blank or preform having a thickness of approximately 0.25 inches, the spin forming process can be used to produce a thickness T3 of approximately 0.25 inches in the mounting flange portion 66, a thickness T4 of approximately 0.19 inches in the transition section 68, a thickness T5 of approximately 0.19 in the cylindrical main body 70, a thickness T6 of approximately 0.25 inches in the squealer band 74, and a thickness T7 of approximately 0.19 inches in the opened end 72. In the prior art brake drum 18, because the mounting flange 20 and the shell 22 were formed by a stamping and rolling process, respectively, it was not possible to thin either one of the flange 20 or shell 22 during the forming thereof. Also, using the spin forming process of step 84 allows the squealer band 74 of the brake drum 100 to be formed of a thickness which, if necessary, is sufficient to enable the brake drum 100 to be balanced by removing material from the squealer band 74, such as by the methods disclosed in the above Carmel et al. and Julow et al. patents.

Although the brake drum 100 of this invention has been described and illustrated as forming the one-piece mounting flange and shell 62 by using a series of spin forming operations followed by a final flow forming operation, the one-piece mounting flange and shell 62 can be formed using other metal forming processes. Also, although the brake drum 100 of this invention has been described and illustrated in connection with a steel one-piece mounting flange and shell 62 and a gray cast iron liner 64, these components can be constructed from other metals. For example, the one-piece mounting flange and shell 62 can be formed from aluminum or alloys thereof, and the liner 64 can be formed from nodular iron, austempered gray iron, or an aluminum composite material. In particular, the liner 64 may be cast from an aluminum based metal matrix composite (MMC). One particular MMC that can be used is an aluminum based MMC containing silicon carbide particulate reinforcement. Such an aluminum MMC is commercially available under the name DURALCAN, a registered trademark of Alcan Aluminum Limited of San Diego, Calif. However, the base alloy of the MMC can comprise other alloys, such as for example, magnesium, or titanium. Also, the particulate reinforcement material can comprise other materials, such as for example, alumina, silicon nitride, graphite, or ceramics.

Also, the brake drum 100 of this invention can be other than illustrated and described herein. For example, the brake drum 100 can be an "integral hub" brake drum (not shown). In addition, although the brake drum 100 of this invention has been described and illustrated in connection with the particular drum brake assembly disclosed herein, the brake drum 100 can be used in connection with other kinds of vehicles and/or other drum brake assemblies. For example, this invention may be used in an automobile and a light or medium duty truck, and/or in a "duo-servo" type of drum brake assembly (not shown), in a "dual mode" drum brake assembly (not shown), wherein the service brake is of the leading/trailing type and the parking and emergency brake is of the duo-servo type, in a "drum-in-hat" disc brake assembly (not shown), wherein the service brake is a disc brake and the parking and emergency brake is a drum brake.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A composite vehicle brake drum comprising:
   a one-piece spun formed metal brake drum component defining a center longitudinal axis and including a cylindrical shell, a mounting flange extending radially inwardly from one end of said shell toward said center longitudinal axis, and an annular lip extending radially inwardly from an opposite end of said shell toward said center longitudinal axis;
   said shell, said mounting flange, and said lip cooperating to define a mold cavity; and
   said mold cavity of said brake drum component then having a liner centrifugally cast therein.

2. The composite vehicle brake drum defined in claim 1 wherein said mounting flange includes a plurality of lug bolt mounting holes formed therein.

3. The composite vehicle brake drum defined in claim 1 wherein mounting flange includes a pilot hole formed therein.

4. The composite vehicle brake drum defined in claim 1 wherein said shell includes a squealer band.

5. The composite vehicle brake drum defined in claim 1 wherein said liner is cast from gray iron.

6. The composite vehicle brake drum defined in claim 1 wherein said liner is cast from a metal matrix composite.

7. The composite vehicle brake drum defined in claim 6 wherein said metal matrix composite is an aluminum based metal matrix composite.

8. The composite vehicle brake drum defined in claim 7 wherein said aluminum based metal matrix composite includes a particulate reinforcement selected from the group consisting of silicon carbide, alumna, silicon nitride, and ceramics.

9. The composite vehicle brake drum defined in claim 1 wherein said liner is cast from nodular iron.

10. The composite vehicle brake drum defined in claim 1 wherein said liner is cast from austempered gray iron.

11. The composite vehicle brake drum defined in claim 1 wherein said metal brake drum component is formed from steel.

12. The composite vehicle brake drum defined in claim 1 wherein said metal brake drum component is formed from aluminum.

13. A method for producing a composite vehicle brake drum comprising the steps of:
   (a) providing a generally circular metal blank;
   (b) spin forming the metal blank to produce a one-piece brake drum component defining a center longitudinal axis and including a cylindrical shell, a mounting flange extending radially inwardly from one end of the shell toward the center longitudinal axis, and an annular lip extending radially inwardly from an opposite end of the shell toward the center longitudinal axis, and wherein the shell, the flange, and the lip cooperate to define a cylindrical mold cavity; and
   (c) subsequent to step (b), centrifugally casting a liner in situ within the mold cavity of the brake drum component to thereby produce the composite vehicle brake drum.

14. The method defined in claim 13 wherein prior to step (b), the step of forming a rough pilot hole in the metal blank.

15. The method defined in claim 14 wherein subsequent to step (c), the step of final forming the pilot hole.

16. The method defined in claim 13 wherein subsequent to step (c), the step of coining the mounting flange.

17. The method defined in claim 13 wherein subsequent to step (c), the step of forming a plurality of lug bolt mounting holes in the mounting flange.

18. The method defined in claim 13 wherein step (b) includes forming a squealer band as part of the cylindrical shell.

19. A composite vehicle brake drum produced according to the method defined in claim 13.

* * * * *